United States Patent [19]
Larsen et al.

[11] Patent Number: 5,835,705
[45] Date of Patent: Nov. 10, 1998

[54] METHOD AND SYSTEM FOR PERFORMANCE PER-THREAD MONITORING IN A MULTITHREADED PROCESSOR

[75] Inventors: Troy Dale Larsen; Jack Chris Randolph; Andrew Henry Wottreng, all of Rochester, Minn.

[73] Assignee: International Business Machines Corporation, Armonk, N.Y.

[21] Appl. No.: 814,390

[22] Filed: Mar. 11, 1997

[51] Int. Cl.⁶ .................................................. G06F 11/30
[52] U.S. Cl. .................................... 395/184.01; 395/677
[58] Field of Search ........................... 395/678, 184.01, 395/677

[56] References Cited

U.S. PATENT DOCUMENTS

| | | | |
|---|---|---|---|
| 529,727 | 3/1894 | Jackson | 395/500 |
| 4,821,178 | 4/1989 | Levin et al. | 395/184.01 |
| 5,179,702 | 1/1993 | Spix et al. . | |
| 5,193,187 | 3/1993 | Strout II, et al. . | |
| 5,355,484 | 10/1994 | Record et al. . | |
| 5,450,349 | 9/1995 | Brown III, et al. . | |
| 5,463,775 | 10/1995 | Dewitt et al. . | |
| 5,490,272 | 2/1996 | Mathis et al. | 395/678 |
| 5,511,192 | 4/1996 | Shirakihara . | |
| 5,537,541 | 7/1996 | Wibecan . | |
| 5,557,548 | 9/1996 | Gover et al. | 364/551.01 |
| 5,657,253 | 8/1997 | Dreyer et al. | 364/551.01 |
| 5,694,604 | 12/1997 | Reiffin | 395/677 |

*Primary Examiner*—Krisna Lim
*Attorney, Agent, or Firm*—Felsman, Bradley, Gunter & Dillon

[57] ABSTRACT

A method and system for performance monitoring within a multithreaded processor are provided. The system includes a processor responsive to instructions within first and second threads and a performance monitor that separately records a first event generated by the processor in response to the first thread and a second event generated by the processor in response to the second thread. In one embodiment, the processor has first and second modes of operation. In this embodiment, when the performance monitor is operating in the first mode, a first counter within the performance monitor increments in response to each occurrence of the first event and a second counter within the performance monitor increments in response to each occurrence of the second event. Alternatively, when the performance monitor is operating in the second mode, the first counter increments in response to each occurrence of the first event and in response to each occurrence of the second event.

19 Claims, 6 Drawing Sheets

METHOD AND SYSTEM FOR PERFORMANCE PER-THREAD MONITORING IN A MULTITHREADED PROCESSOR

BACKGROUND OF THE INVENTION

1. Technical Field

The present invention relates in general to data processing and in particular to performance monitoring within a data processing system. Still more particularly, the present invention relates to per-thread performance monitoring within a multithreaded processor.

2. Description of the Related Art

In order to extract optimum performance from a processor, hardware and software engineers detect and analyze the processor's dynamic behavior. In the past, most of the processor states useful in such processor analysis were accessible to external instrumentation. For example, at low levels of integration, most machines states, bus transactions, and other useful signals were detectable on module interconnects, edge connectors, and chip backplanes. Thus, data could be easily captured and post-processed for use in processor performance analysis.

However, as the level of integration has increased, thereby rendering processor states inaccessible to external instrumentation, it has become necessary to integrate performance monitoring circuitry within the processor in order to capture the empirical data required to optimize both hardware and software. On-board performance monitors typically include one or more counters that each count occurrences of a selected event indicative of processor performance, such as processor cycles, instructions executed, or cache misses. While currently available performance monitors may provide adequate data to analyze the dynamic behavior of conventional processors, a conventional performance monitor that utilizes a single counter to record all occurrences of a selected event cannot provide adequate performance data for a multithreaded processor that provides hardware support for multiple concurrent threads. For example, a conventional performance monitor cannot provide information indicating the number of cache misses attributable to each thread or the number of processor cycles utilized by each thread over a meaningful number of cycles.

Consequently, it would be desirable to provide a multithreaded processor including a hardware performance monitor that independently monitors each of a plurality of threads within the processor.

SUMMARY OF THE INVENTION

It is therefore one object of the present invention to provide an improved method and system for data processing.

It is another object of the present invention to provide an improved method and system for performance monitoring in a data processing system.

It is yet another object of the present invention to provide a method and system for per-thread performance monitoring within a multithreaded processor.

The foregoing objects are achieved as is now described. A method and system for performance monitoring within a multithreaded processor are provided. The system includes a processor responsive to instructions within first and second threads and a performance monitor that separately records a first event generated by the processor in response to the first thread and a second event generated by the processor in response to the second thread. In one embodiment, the processor has first and second modes of operation. In this embodiment, when the performance monitor is operating in the first mode, a first counter within the performance monitor increments in response to each occurrence of the first event and a second counter within the performance monitor increments in response to each occurrence of the second event. Alternatively, when the performance monitor is operating in the second mode, the first counter increments in response to each occurrence of the first event and in response to each occurrence of the second event.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
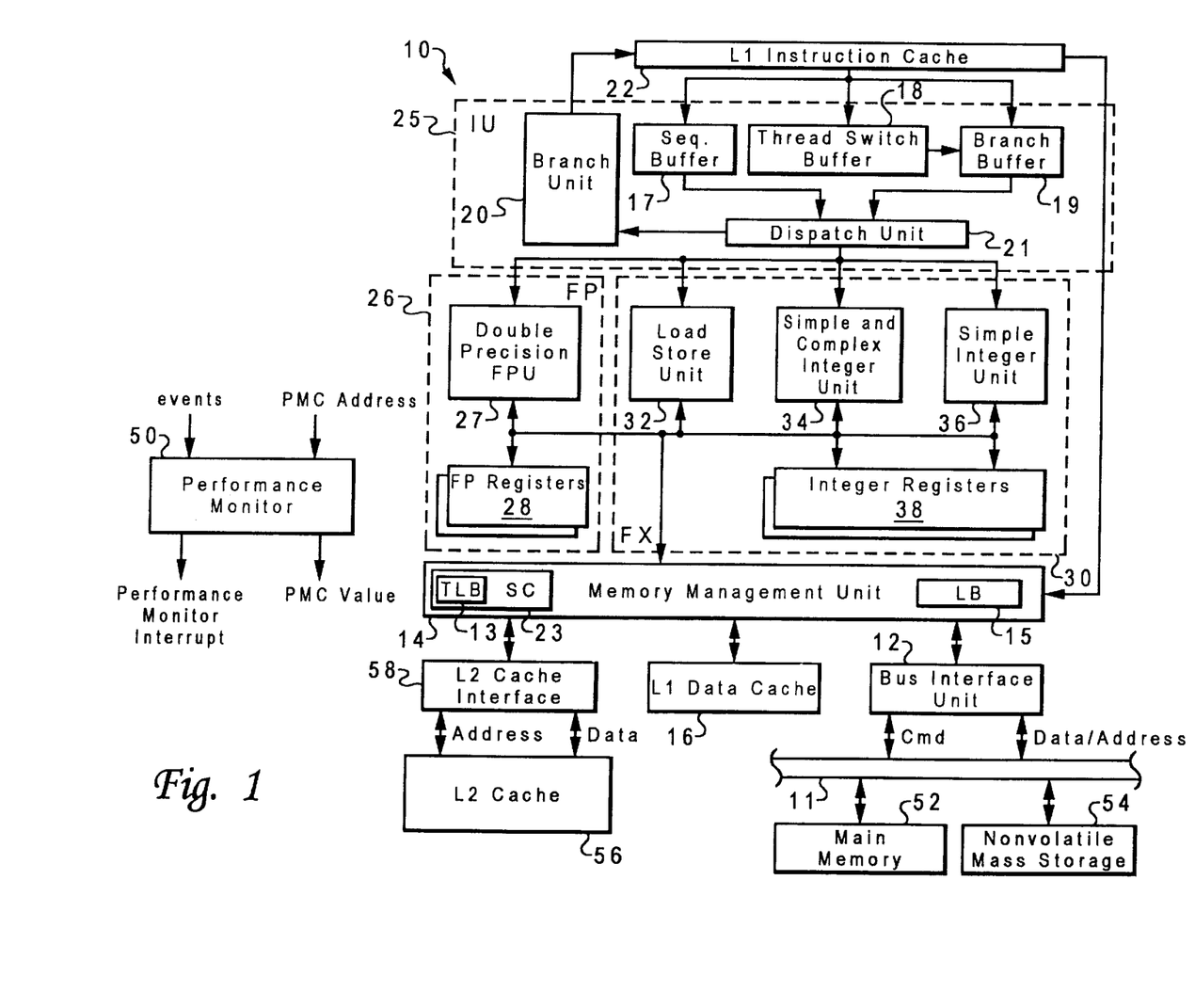
FIG. 1 depicts an illustrative embodiment of a data processing system including a performance monitor in accordance with the present invention.

With reference now to the figures and in particular with reference to FIG. 1, there is depicted a block diagram of an illustrative embodiment of a data processing system in accordance with the invention recited within the appended claims. In the depicted illustrative embodiment, processor 10, which includes both data processing circuitry and an on-board performance monitor 50, comprises a single integrated circuit superscalar microprocessor. Thus, as discussed further below, the various execution units, registers, buffers, memories, and other functional units of processor 10 are all formed by integrated circuitry. Processor 10 preferably comprises one of the line of reduced instruction set computing (RISC) processors available from International Business Machines; however, those skilled in the art will appreciate from the following description that other suitable processors can alternatively be utilized to implement the present invention.

As illustrated in FIG. 1, processor 10 is coupled to system bus 11 via bus interface unit (BIU) 12, which controls the transfer of information between processor 10 and other devices coupled to system bus 11, such as main memory 52 and nonvolatile mass storage 54, by participating in bus arbitration. The data processing system illustrated in FIG. 1 preferably includes other unillustrated devices coupled to system bus 11, which are not necessary for an understanding of the following description and are accordingly omitted for the sake of simplicity.

BIU 12 is connected to Memory Management Unit 14 (MMU), which manages access by processor 10 to data and instructions stored within the various components of the memory hierarchy of processor 10. In the illustrative embodiment, the memory hierarchy of processor 10 includes not only nonvolatile mass storage 54 and main memory 52, but also a unified level two (L2) cache 56, which is accessed through L2 cache interface 58, a level one (L1) instruction cache 22, and a L1 data cache 16. Thus, the management functions of MMU 14 include, for example, performing logical-to-real address translation utilizing Translation Lookaside Buffer (TLB) 13, accessing data within L1 data cache 16 and L2 cache 56 utilizing storage control (SC) circuitry 23, and transferring lines of data between line buffer (LB) 15 and BIU 12. As is understood by those skilled in the art, staging data and instructions within progressively higher speed memory in this manner enables processor 10 to achieve relatively fast access to data and instructions stored within the higher levels of the memory hierarchy, thus improving the overall performance of the data processing system.

L1 instruction cache 22 is further coupled to sequential buffer 17, thread switch buffer 18, branch buffer 19, and branch unit 20, which together with dispatch unit 21 form the instruction unit (IU) logical partition 25 of processor 10. IU 25 controls the execution of one of the multiple possible concurrent hardware threads within the floating point (FP) logical partition 26 and fixed point (FX) logical partition 30 of processor 10. In the present disclosure, the term "hardware thread" or simply "thread" is utilized to describe a group of instructions (that may or may not belong to the same program as other concurrent threads) whose state can be simultaneously maintained in processor hardware with that of one or more other hardware threads and whose execution is governed by processor hardware. Thus, it should be apparent to those skilled in the art that the fine-grained multithreading supported by processor 10 is distinct from the software-managed coarse-grained multitasking supported by many state-of-the-art operating systems. Furthermore, it should be understood that although processor 10 will hereafter be described as supporting only two concurrent threads (i.e., one active and one inactive), the present invention is equally applicable to multithreaded processors that support additional active and inactive threads.

During operation, sequential buffer 17 fetches instructions within the active thread from L1 instruction cache 22 and temporarily buffers the instructions. Sequential buffer 17 passes fetched instructions to dispatch unit 21 in order of receipt. Dispatch unit 21 partially decodes each instruction, thereafter transmitting branch instructions to branch processing unit (BPU) 20 and sequential instructions to the appropriate one of FP 26 and FX 30 for execution. In response to receipt of a branch instruction, branch unit 20 determines the target address at which execution will continue if the branch is taken and supplies the target address to L1 instruction cache 22. While still supplying instructions in the sequential execution path to sequential buffer 17, L1 instruction cache 22 responds to the target address by loading branch buffer 19 with instructions within the target execution path. As a result, if the branch is subsequently resolved as taken, branch buffer 19 is able to supply instructions in the target execution path to dispatch unit 21 without incurring any latency. Thereafter, sequential buffer 17 begins to fetch instructions within the new execution path.

IU 25 performs thread switches in a similar manner. Thread switch buffer 18 fetches and buffers the next instructions to be executed within the inactive thread. In response to the occurrence of a selected event, for example, an L2 cache miss or TLB miss for the active thread, the inactive thread is designated as the active thread and the instructions in thread switch buffer 18 are transferred to branch buffer 19. Dispatch unit 21 then begins to dispatch instructions from the newly activated thread to BPU 20, FP 26, and FX 30. Meanwhile, sequential buffer 17 begins to fetch instructions within the newly activated thread and thread switch buffer 18 begins to fetch instructions within the inactivated thread.

Referring now to FP 26 and FX 30, in addition to branch unit 20 the execution circuitry of processor 10 includes double precision Floating Point Unit (FPU) 27, Load Store Unit (LSU) 32, simple and complex integer unit 34, and simple integer unit 36. Each of execution units 27, 32, 34, and 36 is capable of executing one or more instructions of one or more associated types of sequential instructions during each processor cycle. For example, simple integer unit 36 performs fixed-point mathematical operations (e.g., addition and subtraction) and compare operations utilizing source operands loaded from specified integer registers 38. Following the execution of a fixed-point instruction, simple integer unit 36 stores the result data of the instruction in one or more specified integer registers 38. Similarly, double precision FPU 27 performs double-precision floating-point arithmetic and logical operations, such as floating-point multiplication and division, on source operands loaded from floating-point registers (FPRs) 28 and stores result data within specified FPRs 28. Each of the sequential instruction execution units of processor 10 employs pipelining to further improve the performance of the superscalar architecture of processor 10. As illustrated, each of FPRs 28 and integer registers 38 has multiple duplicate register sets or "ways", which are each associated with a respective one of the multiple concurrent threads supported by processor 10.

According to the present invention, processor 10 includes a performance monitor 50, which as described in detail below, supports independent performance monitoring for each of the multiple concurrent threads supported by processor 10. As illustrated, performance monitor 50 receives as inputs event occurrences generated by the operation of IU 25, FP 26, FX 30, SC 23, BIU 12, and L2 cache interface 58. Selected event occurrences among the numerous event occurrences that may be received by performance monitor 50 are recorded within software-readable and writable Performance Monitor Counters (PMCs) within performance monitor 50. In response to the execution of an architecturally-defined instruction that specifies a PMC "address," performance monitor 50 outputs the value of the specified PMC, for example, by storing the value of the specified PMC within a selected one of integer registers 38. Performance monitor 50 also has a performance monitor interrupt output that is asserted in response to an overflow of one of the PMCs.

In accordance with an important aspect of the present invention, performance monitor 50 has two modes of operation: (1) a global mode in which all occurrences of the same event are recorded together whether or not the occurrences are all generated in response to the processing of the same thread; and (2) a multithread mode in which occurrences of events associated with each thread are recorded separately.

Figure 2:
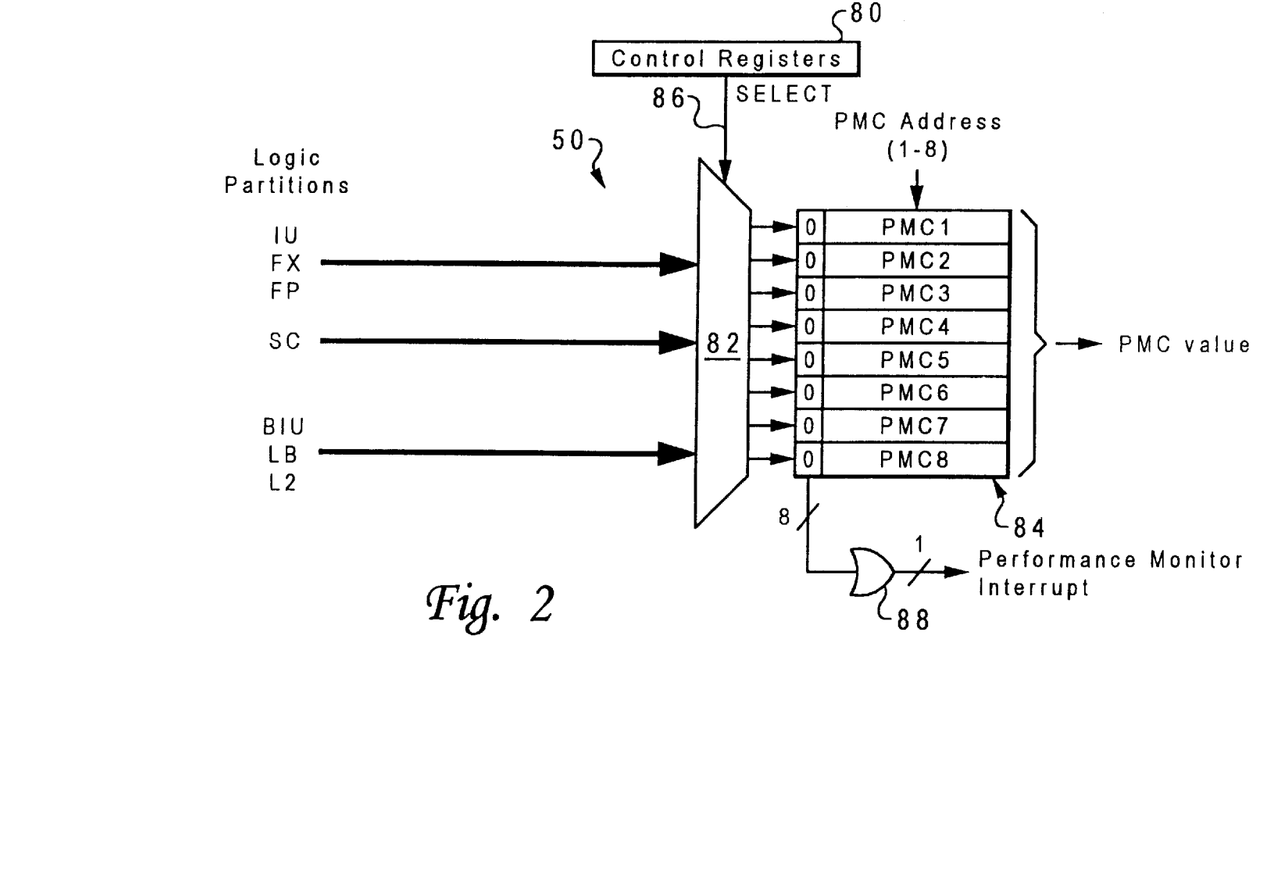
FIG. 2 is a representation of the performance monitor depicted in FIG. 1 when the performance monitor is operating in global mode.

Referring now to FIG. 2, there is depicted a conceptual diagram of performance monitor 50 when operating in global mode. As illustrated, in global mode the event occurrences generated by all of the logical partitions of processor 10 are input into multiplexer 82. Multiplexer 82 then routes the event occurrences to particular counters among PMCs 84 in response to select input 86, which is generated in response to the settings of bit fields within software-accessible control registers 80. The bit fields within control registers 80 specify not only the event occurrences, if any, each of PMCs 84 records, but also the mode in which performance monitor 50 operates (i.e., global or multithread) and when counting is enabled and disabled for each of PMCs 84. In response to receipt of an event occurrence, an enabled PMC increments. As depicted in FIG. 2, if bit 0 of any of PMCs 84 is set to 1, a performance monitor interrupt is generated by OR gate 88.

Figure 3:
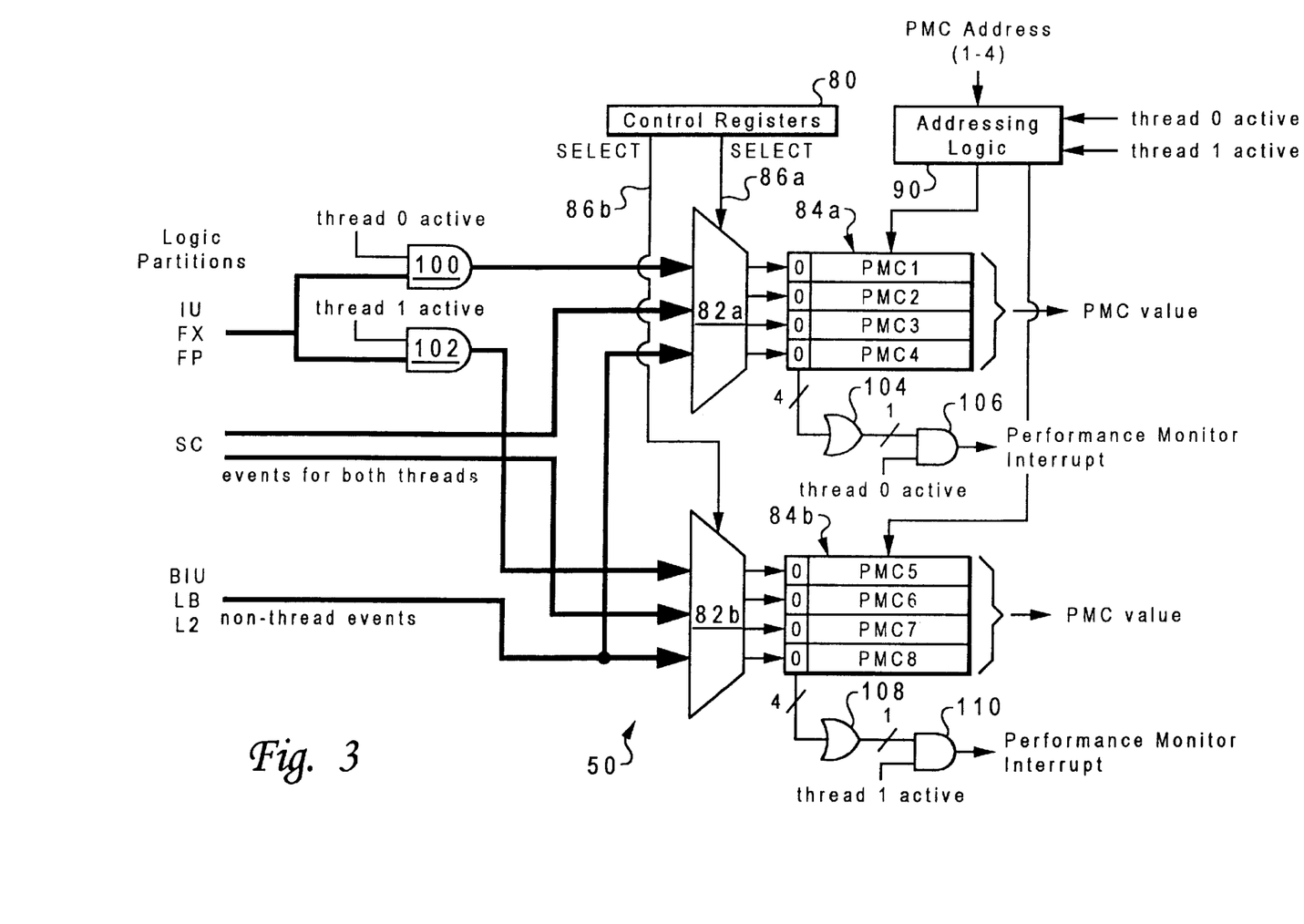
FIG. 3 is a representation of the performance monitor depicted in FIG. 1 when the performance monitor is operating in multithread mode.

With reference now to FIG. 3, there is illustrated a conceptual view of performance monitor 50 when operating in multithread mode. In the depicted illustrative embodiment, processor 10 supports a maximum of two concurrent threads, which are each allocated half of PMCs 84. Thus, PMC1–PMC4, which are identified with reference numeral 84a, are allocated to thread 0 and PMC5–PMC8, which are identified with reference numeral 84b, are allocated to thread 1. As illustrated, event occurrences are routed to PMC1–PMC4 by multiplexer 82a in response to select input 86a, and event occurrences are routed to PMC5–PMC8 by multiplexer 82b in response to select input 86b. Select inputs 86a and 86b are generated in response to the value of bit fields within control registers 80 in the manner described above with reference to FIG. 2.

In contrast to the operation of performance monitor 50 in global mode, when performance monitor 50 is operating in multithread mode event occurrences are not all handled alike. Instead, an event occurrence is handled in a manner dependent upon the event group to which the event occurrence belongs. The first group of events include those associated with only the active thread. Occurrences of these events can be generated by IU 25, FX 30, and FP 26 and include the following:

(1) instructions completed
(2) processor cycles
(3) cycles of storage latency
(4) branch data
(5) data dependencies
(6) unaligned accesses
(7) L1 instruction cache miss count
(8) floating point operations
(9) thread switch counts The second group of events are those that may be associated with either the active thread or an inactive thread. Occurrences of these events can be generated by SC 23 and include the following:

(1) L1 data cache miss events, such as total count, latencies, miss types, etc.
(2) translation miss event (e.g., TLB miss events)
(3) L2 cache miss events The third (and final) group of events are those that are not associated with a particular thread. Occurrences of these events can be generated by BIU 12, LB 15, or L2 cache interface 58 and include:

(1) L2 cache line transitions
(2) L2 cache castouts
(3) L2 cache snoop counts
(4) line buffer usage
(5) system bus utilization
(6) system bus retries As illustrated in FIG. 3, event occurrences in the first event group are received as inputs by AND gates 100 and 102. Event occurrences within the first event group are input to multiplexer 82a only if thread 0 is active and are input to multiplexer 82b only if thread 1 is active. In contrast to event occurrences belonging to the first event group, events within the second group, which as noted above are generated by SC 23 within MMU 14 in the illustrative embodiment, are passed to the appropriate one of the multiplexers 82a and 82b for possible selection regardless of whether the thread associated with the event occurrence is the active or inactive thread. Event occurrences belonging to the third event group are passed to both of multiplexers 82a and 82b for possible selection.

Figure 4:
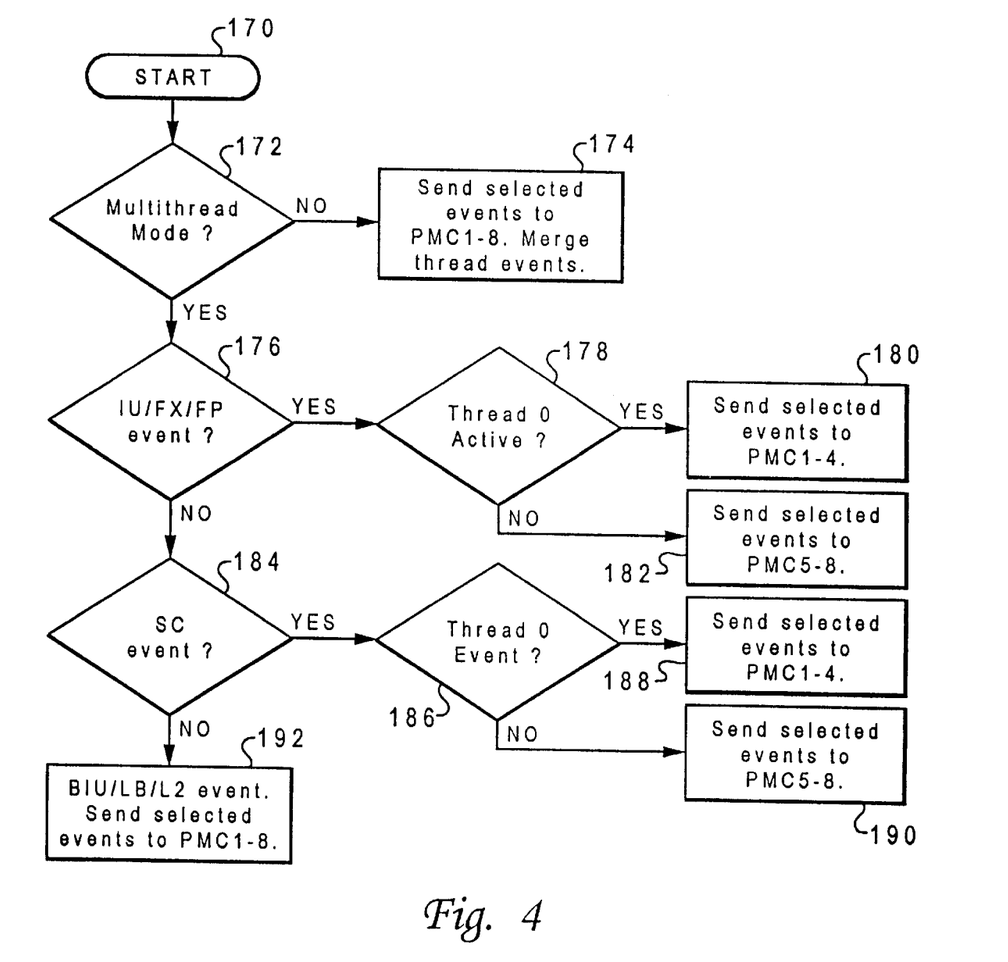
FIG. 4 is a logical flowchart depicting how events are routed to the performance monitor counters when the performance monitor is operating in each of the global and multithread modes.

With reference now to FIG. 4, there is illustrated a logical flowchart that summarizes the method by which performance monitor 50 handles event occurrences for each of the global and multithread modes of operation. As depicted, the process begins at block 170 and thereafter proceeds to block 172, which illustrates a determination of whether or not performance monitor 50 is operating in multithread mode. In response to a determination that performance monitor 50 is not operating in multithread mode but is operating in global mode, the process passes to block 174, which depicts multiplexer 82 routing event occurrences selected by select input 86 to the appropriate ones of PMCs 84. As noted above, occurrences of the same event generated by different threads are merged within PMCs 84 such that a single event count is maintained for each selected event.

Referring again to block 172, in response to a determination that performance monitor 50 is operating in multithread mode, the process proceeds to block 176, which illustrates a determination of whether or not a detected event occurrence was generated by IU 25, FX 30, or FP 26 (i.e., whether the event occurrence belongs to the first event group). If so, a determination is made whether or not thread 0 is the active thread, as depicted at block 178. If thread 0 is the active thread, the process proceeds to block 180, which illustrates the event occurrence, if selected, being transmitted to the appropriate one of PMC1–PMC4. However, in response to a determination that thread 1 is the active thread, the process proceeds from block 178 to block 182. Block 182 depicts the event occurrence, if selected, being transmitted to the appropriate one of PMC5–PMC8.

Returning to block 176, in response to a determination that a detected event occurrence was not generated by IU 25, FX 30, or FP 26, the process proceeds to block 184. Block 184 depicts a determination of whether or not the event occurrence was generated by SC 23. If so, the process proceeds from block 184 to block 186, which illustrates a determination of whether or not the event occurrence was generated in response to processing thread 0 or thread 1. In response to a determination that the event occurrence was generated in response to processing thread 0, the process passes to block 188, which depicts sending the event occurrence to one of PMC1–PMC4, if the event occurrence is selected. Alternatively, in response to a determination at block 186 that the event occurrence was generated in response to processing thread 1, the process passes to block 190, which illustrates sending the event occurrence to one of PMC5–PMC8, if the event occurrence is selected.

Referring again to block 184, in response to a determination that the event occurrence was not generated by SC 23, the process proceeds to block 192, which illustrates a determination that the event occurrence was generated by BIU 12, LB 15, or L2 cache interface 58. In response to this determination, the event occurrence, if selected, is routed to the appropriate one of PMC1–PMC8.

Figure 5:
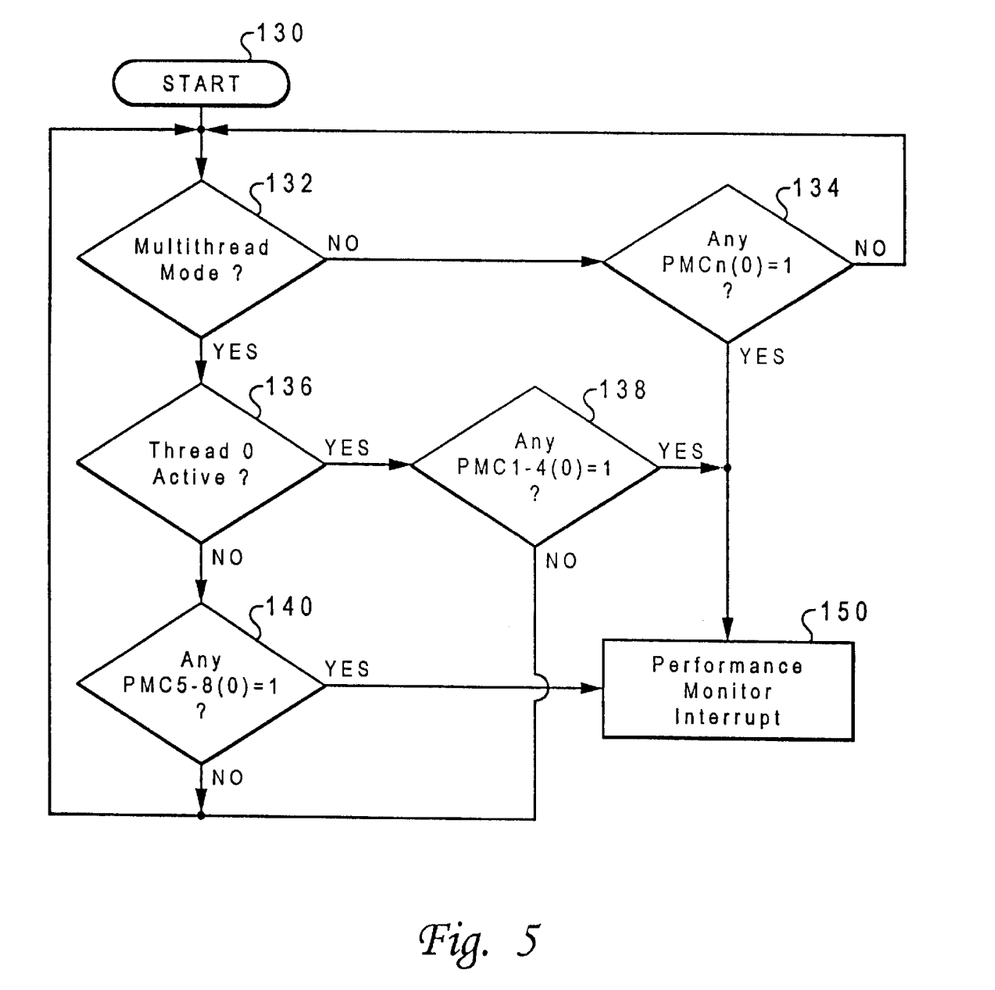
FIG. 5 is a logical flowchart illustrating how performance monitor interrupts are generated when the performance monitor is operating in each of the global and multithread modes.

Referring now to FIG. 5, there is depicted a logical flowchart that summarizes the interrupt behavior of performance monitor 50. As illustrated, the process begins at block 130 and thereafter proceeds to block 132, which illustrates a determination of whether or not performance monitor 50 is operating in multithread mode. The determination illustrated at block 132 may be made, for example, by examining the value of a predetermined bit field within control registers 80. In response to a determination that performance monitor 50 is not operating in multithread mode but is operating in global mode, the process proceeds to block 134, which depicts a determination of whether or not bit 0 of any of PMC1–PMC8 has a value of 1. If not, the process returns to block 132. However, in response to a determination that bit 0 of at least one of PMCs 84 is set to 1, a performance monitor interrupt is generated, as illustrated at block 150 of FIG. 5.

In contrast to global mode, when performance monitor 50 is operating in multithread mode only interrupts associated with the active thread are presented to software. Thus, referring to blocks 136 and 138 of FIG. 5, if thread 0 is active, only interrupts associated with PMCs 84a are presented; interrupts associated with PMCs 84b are saved until thread 1 is again active. Alternatively, as illustrated at blocks 140 and 150, if thread 1 is active interrupts associated with PMCs 84b are presented to software, while interrupts associated with PMCs 84a are saved until thread 0 is again active. In FIG. 3, this interrupt behavior is implemented by OR gates 104 and 108 and AND gates 106 and 110.

Figure 6:
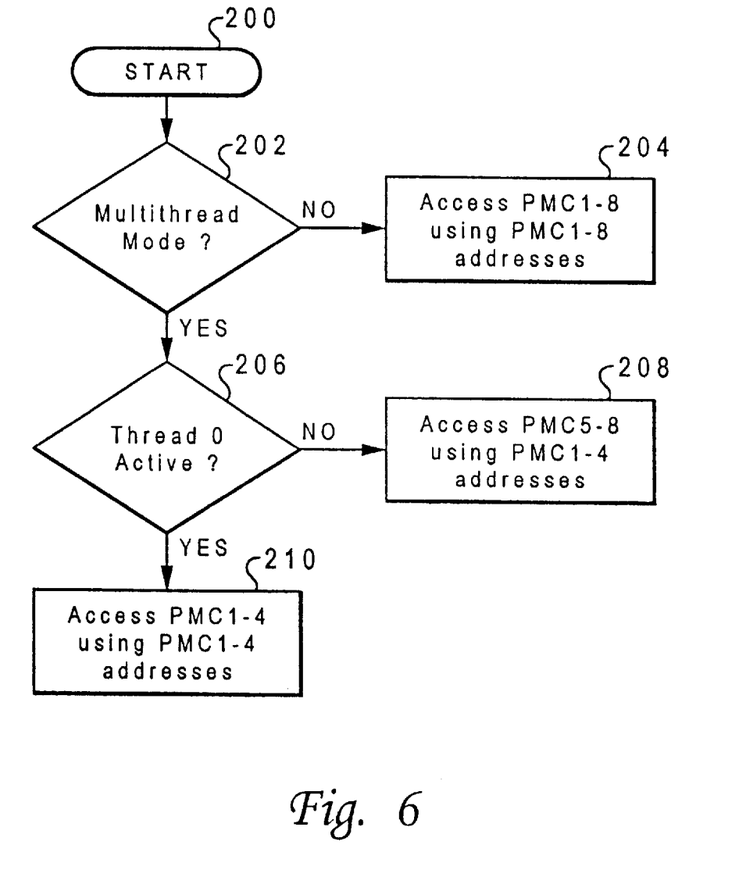
FIG. 6 is a logical flowchart illustrating how the performance monitor counters are accessed when the performance monitor is operating in each of the global and multithread modes.

Referring now to FIG. 6, there is depicted a logical flowchart summarizing the method by which PMC1–PMC8 within performance monitor 50 are accessed. As illustrated, the process begins at block 200 in response to LSU 32 receiving an instruction from dispatch unit 21 that specifies a particular PMC to be read. In response to the instruction, LSU 32 presents the PMC number to performance monitor 50, which as illustrated at block 202 determines whether it is operating in multithread or global mode. As depicted at block 204, in response to a determination that performance monitor 50 is operating in global mode, performance monitor 50 outputs the value of the specified PMC to a specified one of integer registers 38.

Referring again to block 202, in response to a determination that performance monitor 50 is operating in multithread mode, the process proceeds to block 206. Block 206 illustrates a determination of whether thread 0 or thread 1 is the active thread. If thread 1 is the active thread, the specified PMC address, which has a valid range of 1–4, is mapped to a respective one of PMC5–PMC8, as illustrated at block 208. Alternatively, if thread 0 is the active thread, the specified PMC address is utilized to access a corresponding one of PMC1–PMC4, as depicted at block 210. As illustrated in FIG. 3, this PMC address mapping is implemented by addressing logic 90.

As has been described, the present invention provides a multithread processor including a performance monitor that can individually monitor the performance of multiple concurrent threads when operating in a first mode. In addition, the performance monitor can be configured by software to operate in a second mode in which all event occurrences generated by the processor are monitored collectively. While the invention has been particularly shown and described with reference to a preferred embodiment, it will be understood by those skilled in the art that various changes in form and detail may be made therein without departing from the spirit and scope of the invention.

What is claimed is:

1. A system, comprising:
   a processor responsive to instructions within a first thread and instructions within a second thread; and
   a performance monitor that separately records a first event occurrence generated by said processor in response to said first thread and a second event occurrence generated by said processor in response to said second thread, wherein said first event occurrence and said second event occurrence are two occurrences of the same event.

2. The system of claim 1, wherein said processor and said performance monitor are both formed within a single semiconductor substrate.

3. The system of claim 1, said performance monitor including a first counter and a second counter and having a first mode of operation, wherein when said performance monitor is operating in said first mode, said first counter increments in response to said first event occurrence and said second counter increments in response to said second event occurrence.

4. The system of claim 1, said performance monitor including a plurality of counters for recording event occurrences, wherein a first subset of said plurality of counters are allocated to said first thread and a second subset of said plurality of counters are allocated to said second thread, wherein for a particular event, only a counter belonging to said first subset can increment in response to an occurrence of said particular event generated while said first thread is active and only a counter belonging to said second subset can increment in response to an occurrence of said particular event generated while said second thread is active.

5. The system of claim 3, wherein said performance monitor has a second mode of operation, wherein when said performance monitor is operating in said second mode, said first counter increments in response to both said first event occurrence and said second event occurrence.

6. The system of claim 1, wherein said processor generates occurrences of a plurality of diverse events in response to said first and second threads, wherein said performance monitor includes a control that selectively determines a subset of said plurality of diverse events for which occurrences are recorded.

7. The system of claim 1, said multithreaded processor executing said first thread and said second thread one at a time, wherein at least one instruction within said second thread is executed by said processor between generation of said first event occurrence and a third event occurrence generated in response to said first thread, and wherein said performance monitor records said first event occurrence and said third event occurrence together.

8. The system of claim 1, wherein said processor generates said first event occurrence while said first thread is inactive.

9. The system of claim 4, and further comprising addressing logic, wherein in response to a read request from one of said first and second threads, said addressing logic maps said read request to a particular counter in a corresponding one of said first and second subsets of counters.

10. The system of claim 4, and further comprising interrupt generation circuitry, wherein said interrupt generation circuitry generates an interrupt in response to a state of a counter in said first subset only when said first thread is active and generates an interrupt in response to a state of a counter in said second subset only when said second thread is active.

11. A method of performance monitoring within a multithreaded processor, said method comprising:

within a multithreaded processor, processing a first thread and a second thread;

generating a first event occurrence within said multithreaded processor in response to processing said first thread and generating a second event occurrence within said multithreaded processor in response to processing said second thread, wherein said first event occurrence and said second event occurrence are two occurrences of the same event; and recording said first event occurrence and said second event occurrence separately.

12. The method of claim 11, said multithreaded processor including a plurality of counters for recording event occurrences, wherein a first subset of said plurality of counters are allocated to said first thread and a second subset of said plurality of counters are allocated to said second thread, and wherein said first event occurrence and said second event occurrence are two occurrences of a particular event, wherein said step of recording said first event occurrence and said second event occurrence separately comprises:

incrementing a counter belonging to said first subset in response to an occurrence of said particular event generated while said first thread is active; and incrementing a counter belonging to said second subset in response to an occurrence of said particular event generated while said second thread is active.

13. The method of claim 11, said multithreaded processor having a performance monitor including a first counter and a second counter, said performance monitor having a first mode of operation, wherein said step of recording said first event occurrence and said second event occurrence separately is performed in response to said performance monitor operating in said first mode, and wherein said recording step comprises the step of:

incrementing said first counter in response to said first event occurrence and incrementing said second counter in response to said second event occurrence.

14. The method of claim 12, and further comprising:

in response to a read request by one of said first and second threads, mapping said read request to a particular counter in a corresponding one of said first and second subsets of counters.

15. The method of claim 13, wherein said performance monitor has a second mode of operation, said method further comprising the step of:

in response to said performance monitor operating in said second mode, incrementing said first counter in response to both said first event occurrence and said second event occurrence.

16. The method of claim 11, wherein said multithreaded processor generates occurrences of a plurality of diverse events in response to processing said first and second threads, said method further comprising the step of:

selectively determining a subset of said plurality of diverse events for which occurrences are recorded.

17. The method of claim 11, said multithreaded processor executing said first thread and said second thread one at a time, wherein at least one instruction within said second thread is executed by said processor between generation of said first event occurrence and a third event occurrence generated in response to said first thread, said method further comprising the step of recording said first event occurrence and said third event occurrence together.

18. The method of claim 11, wherein said step of generating said first event occurrence comprises the step of generating said first event occurrence while said first thread is inactive.

19. The method of claim 12, and further comprising the step of:

generating an interrupt in response to a state of a counter in said first subset only when said first thread is active and generating an interrupt in response to a state of a counter in said second subset only when said second thread is active.

* * * * *

UNITED STATES PATENT AND TRADEMARK OFFICE
CERTIFICATE OF CORRECTION

PATENT NO. : 5,835,705

DATED : November 10, 1998

INVENTOR(S) : Troy Dale Larsen et al

It is certified that error appears in the above-identified patent and that said Letters Patent is hereby corrected as shown below:

IN THE TITLE, ITEM [54] AND IN COLUMN 1, LINES 1-4

The title should read:

METHOD AND SYSTEM FOR PER-THREAD PERFORMANCE MONITORING IN A MULTITHREADED PROCESSOR

Signed and Sealed this

Sixteenth Day of March, 1999

*Attest:*

Q. TODD DICKINSON

*Attesting Officer*     *Acting Commissioner of Patents and Trademarks*